Patented May 15, 1945

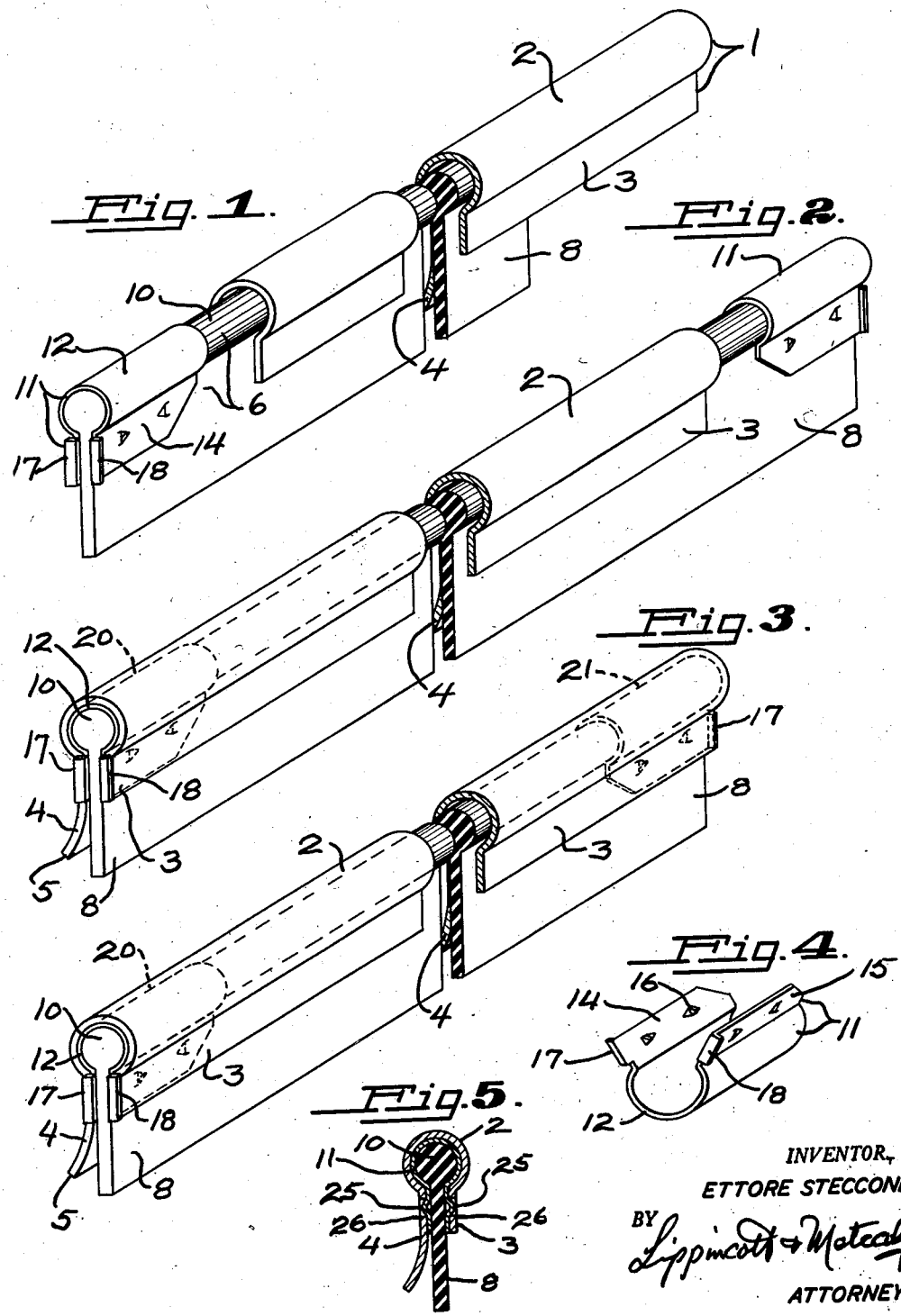

2,376,098

UNITED STATES PATENT OFFICE 2,376,098

MEANS FOR SECURING ELASTIC STRIPS IN A SUPPORT

Ettore Steccone, Oakland, Calif.

Application April 21, 1942, Serial No. 439,908

5 Claims. (Cl. 15—245)

My invention relates to a means for securing elastic strips in a rigid supporting member, and is particularly adaptable by way of example, for use in securing rubber wiping blades in a squeegee frame, such as used for window cleaning.

Among the objects of my invention are: To provide a means for securing an elastic strip in a supporting member; to provide a means for preventing an elastic strip from sliding with respect to an enclosing member; to provide means securing a rubber wiper blade in a squeegee frame, and to provide a simple means for holding a rubber strip in predetermined relation to an enclosing support.

Other objects of my invention will be apparent or will be specifically pointed out in the description forming a part of this specification, but I do not limit myself to the embodiment of the invention herein described, as various forms may be adopted within the scope of the claims.

My invention will be described as applied to a rubber strip frictionally held in a squeegee frame.

In the drawing:

Fig. 1 is a diagrammatic perspective view of a squeegee frame and with a rubber strip mounted therein showing the first step in securing the strip to the frame.

Fig. 2 is a similar view showing the second step.

Fig. 3 is a similar view showing the strip as finally secured to the frame.

Fig. 4 is a perspective view of one of the clips utilized to secure the strip to the frame.

Fig. 5 is a cross-sectional view of a modified form of my invention.

In these figures the squeegee handle has been omitted for clarity of illustration.

Referring directly to the drawing for a more detailed description of my invention as applied to a squeegee, a frame 1 is provided having a partially cylindrical portion 2, a front blade supporting portion 3 and a longer rear blade support portion 4, terminating in a curved edge portion 5, substantially as set forth in my prior Patent No. 2,123,638.

A wiping rubber blade 6 is provided, having a flat portion 8 fitting between frame portions 3 and 4, and a partially cylindrical edge bead 10 fitting the cylindrical portion 2 of the frame.

Under usual circumstances of squeegee use, the wiper blade is slid laterally into the frame from one end thereof until the ends of the blade and frame substantially register, and is held in place by friction only. However, during the operation of the squeegee, the lateral stresses applied by the user of the squeegee on the wiper blade as it is pressed against window glass, have a tendency to cause the wiper blade to move laterally and become displaced in the frame. Under these conditions it is necessary for the operator to stop and pull the wiper strip back into the frame.

In order to obviate this difficulty and to prevent such lateral displacement from occurring, I secure the wiper blade in the frame by use of end clips 11 as shown in Fig. 4. Each end clip has a partially cylindrical portion 12 fitting bead 10 of the wiper blade, and opposing side portions 14 and 15 adapted to fit against each side of the flat portion 8 of wiper blade 6. Flat clip portions 15 are provided with inwardly extending teeth 16 for engaging the resilient material of the wiper blade when clamped thereon.

On one end of the flat portions 14 and 15 of the clip are positioned outwardly turned stops 17 and 18. The entire clip is preferably supplied in half-open position as shown in Fig. 4 in order that the clips may conveniently be applied to the bead of the wiper blade.

In Fig. 1 I have shown the first step in assembling the rubber strip in the frame utilizing the clips. The wiper blade 6 is pushed laterally partly into the frame, and then one clip 11 is pressed around the bead adjacent the end of the strip with the flat portions 15 and 14 of the clip against opposite sides of the flat portion 8 of the wiper blade, and with the stops 17 and 18 on the clip adjacent the end of the blade. By squeezing against the sides of the clip 12, the strip can then be pulled into the frame with the clip entering the frame, as shown by the dotted lines 20 in Fig. 2 and with the stops 17 and 18 engaging the front and rear end surfaces 22 and 23 respectively of the frame. The application of the clip to the wiper blade prevents that end of the wiper blade from moving inwardly into the frame due to the engagement of the stops 17 and 18 with the frame.

A second clip 11 is then applied in a similar manner to the other end of the wiper blade, by pulling the wiper blade out of the opposite end, thereby stretching the rubber. There will be sufficient stretch in the wiper blade to allow the wiper blade to be pulled a sufficient distance out of the frame to apply the second clip to this end of the blade, as shown in Fig. 2. The rubber of the wiper blade is then allowed to contract and the second clip is then entered into the frame, as shown in Fig. 3, with its stops 17 and 18 preventing movement of the blade edge inwardly.

If desired, the resilient blade may be made slightly shorter than the frame in order that the clips may at all times have a slight force urging them together against the frame. The final result is shown in Fig. 3 where both clips are within the frame, each clip preventing one end of the rubber blade from movement toward the other end.

It has been also found that the resiliency of the rubber enclosed by the clips when the clips are inserted within the frame, exerts an outward pressure against the clips and thus holds the clips firmly in place by friction alone. Under these circumstances the forces are such as to provide a sufficient outward pressure so that the clips will work entirely satisfactorily when applied to a blade which is of the exact or even slightly greater length than the frame.

A modification of my invention is shown in Fig. 5, in section. The clip 11 in this modification is substantially the same as that shown in Fig. 4, with the exception that the end projections 17 and 18 are dispensed with, and the opposite flat portions 14 and 15 of the clip are provided with bumped-out projections 25. The opposed flat portions 3 and 4 of the frame are then drilled to provide opposite holes 26 therein, adjacent the end edges of the frame 11, into which the projection 20 may enter when the clip is forced inside the frame in the positions indicated by the dotted lines 20 and 21 in the former modification.

In the modification shown in Fig. 5, the clip 11 is placed around the end of the wiper blade as before, and then the clip is compressed and forced into the frame until projections 25 snap into the opposite holes 26 by virtue of the resiliency of the wiper blade material. The registration of the projections 25 in the holes 26 prevents further relative movement of the strip in the frame. The end result is the same and the two forms are deemed fully equivalent.

While I have described my invention as applied to a squeegee, it will be obvious to those skilled in the art that my invention may be used in a similar manner in conjunction with other devices having equivalent elements.

I claim:

1. In a device of the character described, a substantially rigid frame having a channel therein, a resilient member having a portion entering said channel and slidable therein, and means holding said resilient member portion in said channel under tension, said means including a clip attached to each end of said member entering said channel at the ends thereof, each of said clips having projections thereon preventing inward movement thereof.

2. In a device of the character described, a substantially rigid frame including an open ended channel, a resilient member having a portion entering said channel and slidable therein, a clip attached to one end on said member and disposed at one open end of said channel, said clip having projections thereon limiting inward movement of said clip into said open end of the channel, a second clip, also having projections thereon, said second clip being disposed at the other end of said open ended channel and attached to the other end of said resilient member under tension of said resilient member.

3. Means for holding an elongated resilient member from sliding in a support channel having open ends comprising a clip engaging one end of said resilient member and having points engaging the material of said member, said clip being placed into one end of said channel, said clip having outwardly directed portions engaging the end of said channel to limit inward movement of said clip and engaged member and a second clip at the other end of said channel.

4. A squeegee comprising a substantially rigid channel member having open ends, a resilient strip slidably receivable in said channel member, and a clip at each end of said resilient strip and attached thereto interlocking said strip with said channel at the ends of said channel only, to preclude slidable shifting of said resilient strip in said channel member.

5. A squeegee comprising a substantially rigid channel member having exposed end edges, a resilient strip slidably receivable in said channel member, and a clip having stops and being affixed to each end of said resilient strip with said stops abutting adjacent end edges of said channel member, to preclude slidable shifting of said resilient strip in said channel member.

ETTORE STECCONE.